March 14, 1933.   C. BATEHOLTS   1,901,837
PLATE SURFACE
Filed July 18, 1929
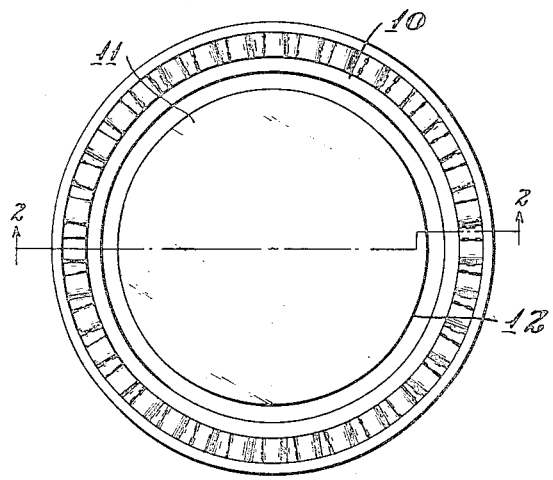
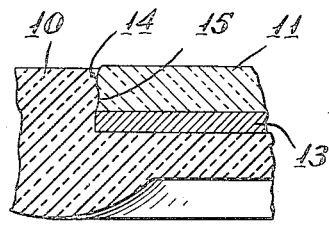
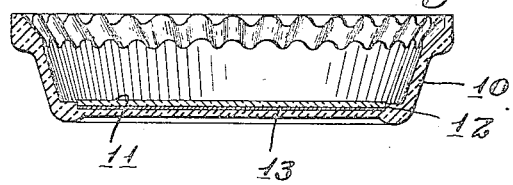
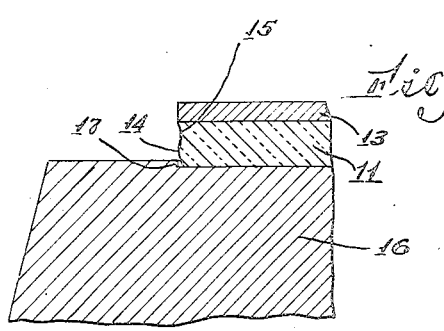
Inventor
Clinton Bateholts
by Mitchell, Chadwick & Kenn
Attorneys Patented Mar. 14, 1933

1,901,837

UNITED STATES PATENT OFFICE

CLINTON BATEHOLTS, OF HOOSICK FALLS, NEW YORK, ASSIGNOR TO SPECIALTY INSULATION MANUFACTURING COMPANY, INC., OF HOOSICK FALLS, NEW YORK, A CORPORATION OF NEW YORK

PLATE SURFACE

Application filed July 18, 1929. Serial No. 379,192.

This invention pertains to plate surfaces.

It provides for the secure and permanent surfacing with glass, or with other vitreous or with ceramic material, of a large flat surface on a molded solid body, as, for example, a body made of a molded condensation product of phenol and an aldehyde or of a synthetic rubber. The article as a whole, having the plate surface of the invention and herein referred to as a "plate", may for example be a tray, as a tray for smoker's use, or a serving tray or plate, or a table top, or any other article on which such a surface is desired. While the plate surface to the covering of which the invention relates will usually be flat, or approximately so, and is so represented in the description which follows, it will be obvious that the application of the invention is not limited to this form of plate. And while the portion of the article for which the invention provides a vitreous covering may be essentially flat, the other surfaces of the article may have any desired shape.

Hitherto, plates of this composite character have not been known so far as I am aware. If it has been attempted to hold a glass covering by reliance on plaster of Paris, cement or glue, it has not been found possible to retain the glass in a securely permanent manner. With such a surface protection, the plate is protected against becoming chipped or charred when in use, as it might be if made wholly of the synthetic material, and it is considerably lighter, stronger and less expensive than if made wholly of glass or porcelain.

By the present invention, a plate of vitreous material is mounted as an insert over a broad surface of the synthetic molded material and is held securely by mechanical means—as by interlocking—by the full cohesive strength of the molded material around the edges of the insert. The interlocking formation of the edge of the insert is obtained by cutting the insert from a larger plate. Assuming it to be glass, the edge thus "cut" will have a characteristic conchoidal fracture, or if it be porcelain or ceramic material, it may have a granular fracture; but in either case, the edge surface referred to above as being "cut" will be actually a fractured surface, rather than a sheared surface, and will have irregular indentations and projections which will constitute interlocking joints with the reverse projections and indentations that will be formed, precisely fitting them, when the material surrounding its edge flows, under heat and pressure, in the molding operation.

I have found that an insert of this kind can, by the present invention, readily be fixed in place in a tray of synthetic plastic material, the best time being during the molding operation. A tray of this kind has many advantages, among them that it is easily cleaned, that it is inexpensive to manufacture, that it may be effectively embellished by a printed, imprisoned ornamental sheet under the glass, that it and its embellishment are not subject to being marred by scratching, chipping or burning, and that it is susceptible of being made in an infinite variety of patterns at practically no cost for the changing from one pattern to another. Other advantages will be apparent as the description of the invention proceeds.

For purposes of illustration, the plate shown is a smoker's tray provided with a vitreous insert, specifically glass, and an embellishing insert of white paper. In the drawing, Figure 1 shows the tray as seen from above;

Figure 2 shows, in cross section, an elevation of the tray;

Figure 3 shows a cross section at the joint, represented conventionally and greatly enlarged; and Figure 4 shows a cross-section of the insert in the process of being molded in place.

The tray consists mainly of a molded body 10, being the final, solid condensation product of suitable materials, selected at option from among the many which are available for such work, for example, that described in the patents of William W. Carter, Nos. 1,251,862 and 1,251,863 of January 1, 1918, entitled "Rubber substitute and process of making the same". It is customary in making molded articles of this general character to subject the material to heat and pressure within the confines of a mold, the mold giving the desired shape to the article. The same can be done in this case, since it is not necessary to use different equipment from that now available. The tray shown in the figures is intended to be representative, in this sense, of a molded plate of any desired material and design.

On the top of the base of the tray shown in Figure 1, there is located the vitreous insert 11, constituting the bottom of the interior of the tray. In the form illustrated, this is interlocked in a recess 12 of the material 10, the interlocking being accomplished by the flowing of the plastic material 10 to fit the convex portions 14 and the concave portions 15 of the conchoidal fracture at the edge of the insert. It is merely necessary to lay the glass and the embellishing insert 13, if any, on the bottom of the mold before the synthetic plastic material is introduced. This latter may be introduced in sheet form or as a preformed pill, but is usually introduced as a powder which, under heat and pressure, first melts and then solidifies. While molten, the high pressure makes it flow perfectly.

In view of the fact that the face of the glass 11 which is uppermost in Figures 2 and 3 lies, as shown in Figure 4, on the flat surface of the bottom part 16 of the mold, the glass itself, or any other insert 13 which accompanies it, becomes in a sense the effective bottom of the mold. When the molding material then flows in the mold, it flows into the most intimate contact with the exposed side and the edges of these inserts. Thus it surrounds the inserts, except that side of the glass which lies against the base of the mold, and, solidifying in this position, interlocks itself with the conchoidal edges of the glass.

The result is that the glass and the body of the tray are interlocked by reason of the irregularities, comprising recesses and projections in the edge of the glass, which intermesh with identically reversed cooperating projections and recesses. If it is desired to prevent any danger of the molten material being undesirably forced under the edge of the glass in the mold, there may be provided in the mold bottom a shallow recess 17 fitted to receive the inserted glass. As shown in Figure 4, this recess serves the further function of easily centering and holding the glass in the desired position during the flowing of the material. The embellishing insert 13 may be a printed or painted picture or other design.

If desired, the tray as a whole may be molded separately, the interior bottom being machined or otherwise manipulated to provide an appropriately shaped undercut recess. The disk 11 may then be inserted, being held in place by cement extending under the material 10 of the tray and interlocking with the glass insert 11. This, however, is an expensive procedure as compared with molding the disk in during the process of forming the tray and does not produce such good results. In a slightly different form, the invention may also be practiced by forming the tray as a whole and then, before cooling, pressing the disk 11 into place. This procedure relies in part on the tendency of the plastic to yield under pressure, thereby conforming to the shape of the edge of the disk 11, and in part on the shrinkage induced by the subsequent cooling. Both of these factors contribute to bring about the interlocking of the tray material with the irregularities of the fractured edge of the disk.

In this description of the invention, the terms "conchoidal" and "granular" have been used specifically in connection with the fracture of vitreous materials, such as glass, and ceramic materials, such as pottery. For a generic term which will include both of these fractures, and also fractures which may partake of the characteristics of both to some extent, the word "irregular" is used in the accompanying claims. Vitrified materials and ceramics have common, or equivalent, characteristics so far as the present invention is concerned, so the term "baked earthen material" is used herein with a signification broad enough to cover both.

Inasmuch as the above description is for illustrative purposes only, it will be understood that the invention is not restricted to the form, the arrangement of parts, or the materials mentioned, but is capable of variation within wide limits. It is intended that the patent shall cover, by suitable expression in the appended claims, whatever features of novelty exist in the invention herein disclosed.

I claim as my invention:

1. An article in the nature of a plate, comprising a body and an unitary surfacing plate therefor, the said surfacing plate having conchoidal edge surfaces, and the material of the said body being flowed into engagement with the conchoidal irregularities of the edge surface of the plate, and being constricted thereon, whereby the body and its said plate surfacing are in contact along a conchoidal surface and are thereby held together.

2. An article in the nature of a plate, comprising a molded body and an unitary surfacing plate therefor, covering a major part of one face thereof; said surfacing plate having the margins of its face free from being covered by the said body or other fastening material, but having at its edge a surface of conchoidal fracture into whose irregularities the material of the body is molded, so that it and the material of the surfacing plate interengage there, irregularly over and under each other between the planes of the thickness of that plate; whereby the said surfacing plate is held on the said body.

3. A dish comprising a body of synthetic organic molded material, inherently stiff and constituting the body of the dish, and a surfacing plate of glass, held directly by the body material; said body material being molded into a conchoidal surface of mutual contact, of glass and material at the edge of the glass, whereby the glass plate is secured on the face of the body.

Signed at Hoosick Falls, New York.
CLINTON BATEHOLTS.